INVENTOR.
RAYMOND B. CLARK
BY ROY C. CLARK
ATTORNEYS.

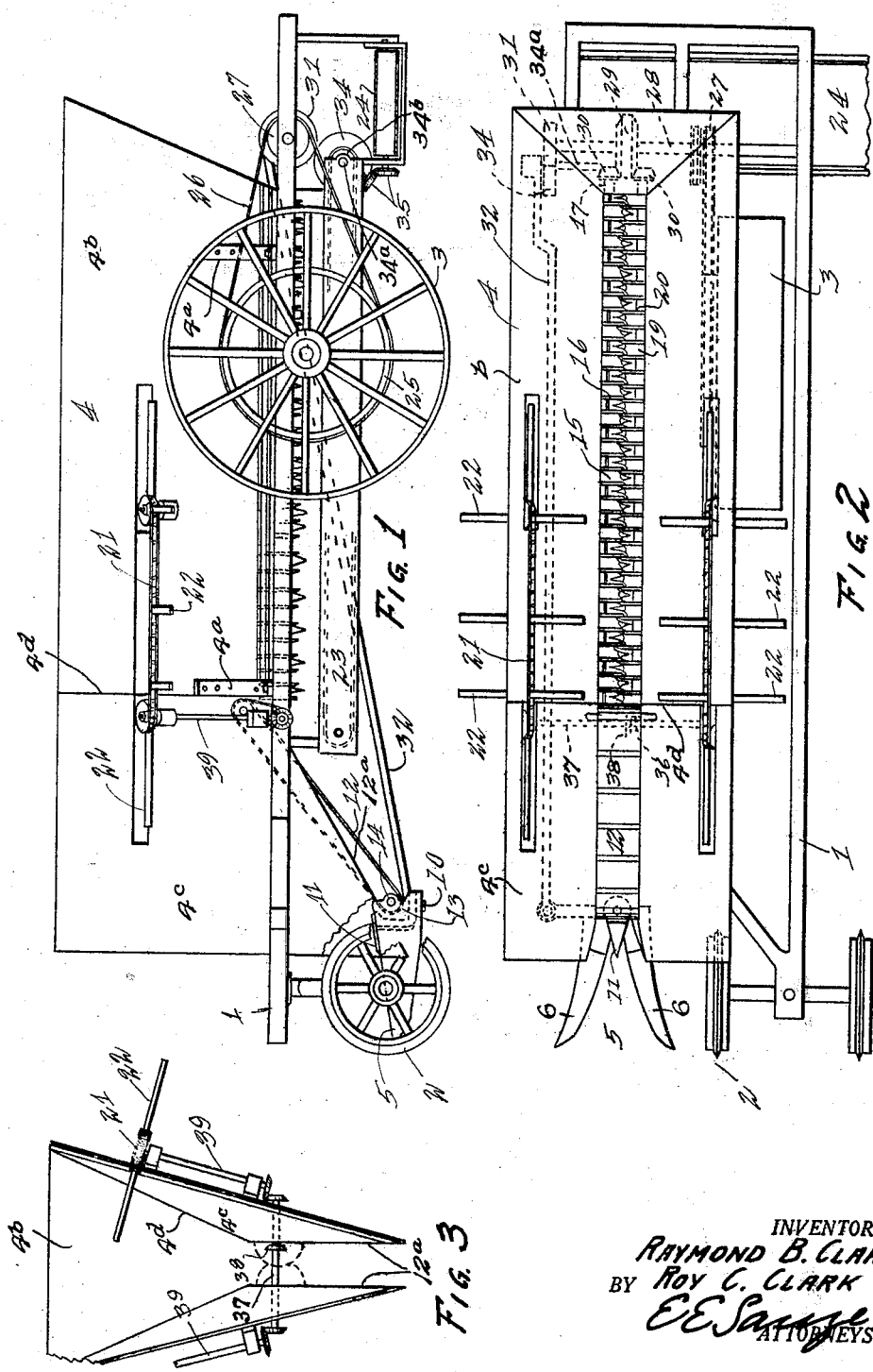

Patented May 25, 1926.

1,586,069

UNITED STATES PATENT OFFICE.

RAYMOND B. CLARK AND ROY C. CLARK, OF WALLA WALLA, WASHINGTON.

FEED HARVESTER AND CHOPPER.

Application filed May 9, 1921. Serial No. 467,920.

This invention relates to farm implements used for harvesting and preparing ensilage, and has for its object to provide a machine that will cut standing fodder in the field and prepare it for the silo.

A further object is to provide a means that will harvest fodder of various kinds, that will cut it into small pieces, and that will convey it into a vehicle for transportation to the silo.

A further object is to provide a means that will cut sunflowers for use as a food, and handle the round and relatively flat head as well as the stalk, and that will seize all cut fodder as it enters the hopper of the machine, and after knocking the stalks downward to a relatively horizontal position to provide a means to positively draw the fodder through the chopping mechanism.

A further object is to provide a means that is relatively cheap to construct and that is highly efficient in its action.

With these and other objects in view, reference is now had to the accompanying drawings in which—

Fig. 1 is a side elevation of the device;

Fig. 2 is a plan view thereof;

Fig. 3 is a front elevation of the hopper and one of the gathering chains;

Figure 4:
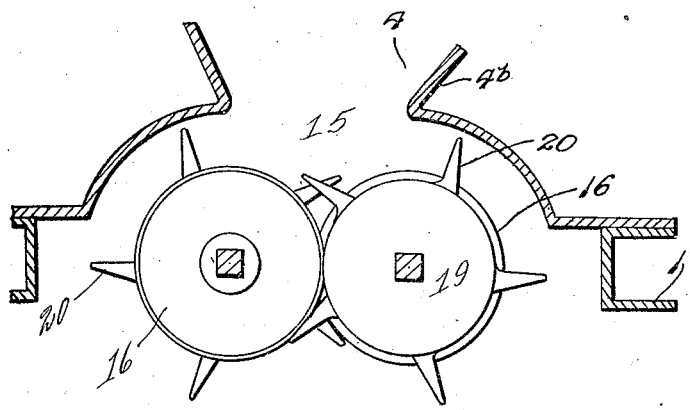
Fig. 4 is an end elevation of the chopper and cleaning and feeding means.

Having reference to the drawings, like numbers refer to like parts throughout, and the numeral 1 refers to the vehicle frame of the machine which is supported by guide wheels 2, a drive wheel 3, and such other wheels as may be necessary in a machine of this class.

A hopper 4 is attached to the frame by braces 4$^a$ and comprises a body portion 4$^b$ and a forward portion 4$^c$, with the two portions joined together as at 4$^d$, and suspended from the frame by means of the hopper 4, or other means, is a shoe 5, consisting of a pair of extended diverging prongs 6—6, wherewith to gather the folder. The shoe extends forwardly and at its rear end terminates in a recess forming a depressed bearing portion 7. The bearing portion is provided to rotatably mount the head 9 by means of the pivot 10, the head in turn mounting the cutting blade 11. This cutter is so constructed that the pivotal portion is below the upper surface of the shoe while the blade 11 is in operable relation with the upper surface of the shoe with which it co-operates to form a cutter for severing the stalk of the fodder. By this construction the lower end of the elevator 12 may be enclosed and is placed below the cut off end of the stalk after it has passed over the blade, and hence the butt of the stalk must drop onto the elevator in its passage through the machine.

The shoe is also provided with wings 13 which enclose the bottom of the elevator and in which are orifices 14, and these orifices provide journals for the lower end of the elevator.

The elevator 12 extends rearward and upward through the slot 12$^a$ in the forward portion 4$^c$ of the hopper to deposit onto the chopper 15 which is positioned horizontally in the machine. The cutter, elevator and chopper are closely positioned and in line and hence the machine has a minimum width which is of advantage in passing between rows.

Figure 5:
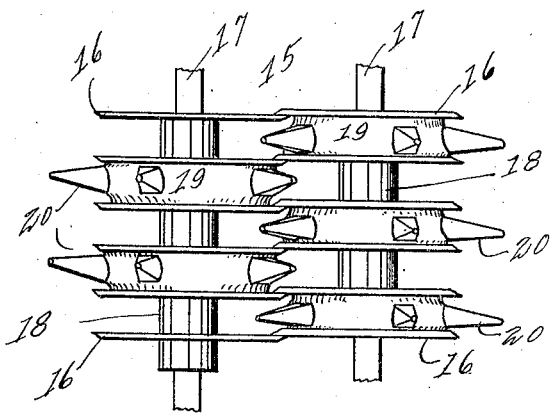
Fig. 5 is a plan view of a section of the chopper.
Figure 6:
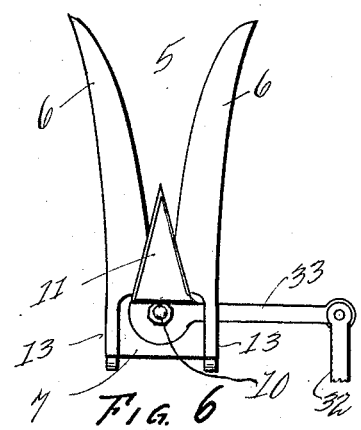
Fig. 6 is a plan view of the shoe and cutter.
Figure 7:
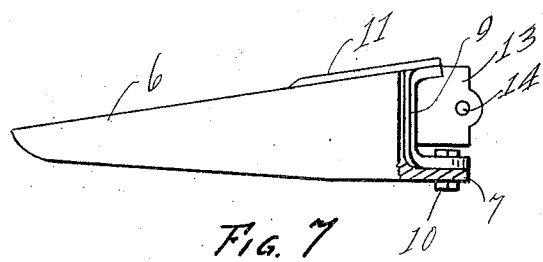
Fig. 7 is a side elevation of the shoe and cutter, partly in section.
Figure 8:
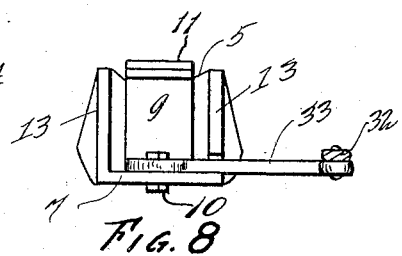
Fig. 8 is an end elevation of the shoe and cutter.

The chopper 15 consists of a pair of cutting members, each member consisting of a multiplicity of discs 16 mounted on shafts 17, and spaced by spacing sleeves 18, in the usual manner, and by the cleaning and feeding spacers 19. The discs coact to form cutters, or choppers, as clearly shown in Fig. 5, and in the usual manner of circular cutters.

The spacers 19 alternate with the spacing sleeves 18 on one cutting member, with the spacers 19 of one member positioned opposite the spacing sleeves 18 of the other member. It is understood however that all the feeding spacers 19 may be on one member only if desired.

The spacers 19 are provided with fingers 20 which extend radially and which in their revolutions pass between the opposite discs, by which means all pieces of ensilage are removed from between the discs. The fingers also forcibly feed the chopper in the manner shown in Fig. 4, wherein it is shown that the fingers close by each other and upon the stalk, drawing it forcibly against the discs; hence the spacers 19 act as spacers, as cleaners and as feeders, and the enlarged body of these spacers prevent accumulation between the discs which are spaced thereby.

The hopper 4 extends upward from the machine and acts as a guide to the elevator 12 to prevent the stalks from falling off the side of the elevator, and is constructed of sufficient size to receive any feed having large portions, such as sunflowers, and to direct it to the chopper.

Preferably built in the walls of the hopper are gathering chains 21 upon which are mounted arms 22, the purpose of which will be presently explained.

Beneath the chopper is a conveyor 23 which is positioned horizontally and the full length thereunder to receive the chopped silage and to convey it to the cross conveyor 24 which in turn conveys the silage to one side or to a vehicle carrier if desired.

The operating mechanism will now be explained:

The drive wheel is provided with a sprocket wheel 25 from which a chain 26 drives the sprocket 27 and counter shaft 28. The counter shaft carries a two-faced bevel gear 29 meshing with the pinions 30, wherewith the shafts 17 of the chopper are driven. On the end of the counter shaft is a faced spur gear and sprocket wheel 31, the face carrying a pin (not shown) upon which is mounted a pitman 32 which in turn is pivotally attached to the arm 33 of the cutter head 9.

The gear 31 meshes with the gear 34 mounted on the shaft 34$^a$, in turn mounting a drum 34$^b$ wherewith to drive the conveyor 23 which is mounted thereon and by the bevel gears 35, or other suitable means, the cross conveyor is driven.

One of the shafts 17 is also provided with a bevel pinion 36 and the counter shaft 37 carries a corresponding pinion 38 and is driven by the two last mentioned pinions and in turn drives the gathering chains 21 by means of the shafts 39.

In use the machine is driven with the prongs 6 of the shoe 5 straddling the row. As the machine advances the cutter 11 engages the oncoming stalk and severs it close to the ground when the butt of the stalk will drop onto the elevator 12, the butt being forced back thereonto by the next oncoming stalk.

As the forward movement of the machine continues the top of the oncoming stalk presses against the top of the cut stalk and forces the latter back to a position within reach of the arms 22.

The arms 22 are geared to travel with a greater linear speed than the elevator and by this arrangement the upper end of the stalk is thrown to a generally horizontal position when gravity and the weight of the succeeding stalks will press the stalk down until it is caught by the fingers 20 that in turn force the stalk through the chopper.

The chopped stalk now falls onto the conveyor 23 on which it is conveyed to a cross conveyor 24 arranged to discharge at one side of the machine.

Having thus described our invention, we claim:

1. In a feed harvester and chopper, in combination with a frame and drive wheel, a shoe, having diverging prongs, suspended from said frame, said shoe provided with a depressed bearing portion and rearwardly extending wings, a cutting member operably mounted on the said depressed bearing portion, an elevator operably mounted, at one end, within said wings, with its other end extended rearwardly, a chopper, provided with a combined cleaning and feeding means, positioned below the said other end of the elevator, a hopper positioned about the said elevator, with its discharge adjacent to the cutting member, gathering chains operably positioned above the elevator and the cutting member, a conveyor positioned beneath the chopper, a cross conveyor positioned adjacent to said conveyor, and means for operating said machine from the drive wheel thereof.

2. In a feed harvester and chopper, in combination with a vehicle frame and drive wheel, a shoe provided with a recessed rearward end, a cutting member operably mounted in the recessed rearward end of said shoe, an elevator having its lower end contained in and operably attached to said recessed rearward end, a chopper, comprising a multiplicity of spaced, co-acting, cutting discs, and provided with spacers positioned between said discs, said spacers provided with fingers, a hopper positioned to discharge onto, and to form a guide adjacent to said elevator, gathering chains mounted in the walls of said hopper, a conveyor, a cross conveyor, and a means for operably connecting the mechanism of the machine to said drive wheel.

3. In a feed harvester and chopper, in combination with a vehicle frame and drive wheel, a shoe provided with a recessed rearward end, a cutting member operably mounted in said recessed rearward end, with a blade positioned in operable relation with the upper surface of said shoe, an elevator having its lower end positioned below said cutting member and extended upward to deposit on to a chopper, said chopper comprising a pair of co-acting cutting members, each member provided with a plurality of pairs of spaced discs, and cleaning and feeding members mounted between said discs, a hopper positioned to discharge onto a conveyor, a gathering means operably positioned above said elevator, a conveyor, a cross conveyor, and means for operably connecting the mechanism of said machine to said drive wheel.

4. In a feed harvester and chopper, in combination with a vehicle frame and drive wheel, a shoe, a cutting member positioned in operable relation to the surface of said shoe, and having its bearing positioned below said surface, an elevator, a chopper, comprising a pair of co-acting cutting members, each member provided with a multiplicity of spaced discs, and cleaning and feeding members attached to and operable with said discs, a hopper, gathering means mounted in the walls of said hopper, a conveyor beneath said chopper, a cross conveyor, and a means for operably connecting the mechanism of the machine to said drive wheel.

5. In a feed harvester and chopper, in combination with a vehicle frame and drive wheel, a shoe, a cutting member pivotally mounted below said shoe and positioned in operable relation with the upper surface of said shoe, an elevator, a chopper, comprising a pair of co-acting cutting members, each member provided with a multiplicity of spaced discs, spacer members provided with fingers, forming a cleaning and feeding means, said spacers positioned between said discs, on each of said cutting members, a hopper, gathering chains operably mounted in said hopper, and provided with arms extending therefrom, a conveyor beneath and paralleling said chopper, a cross conveyor and a means for operating said harvester and chopper.

6. In a feed harvester and chopper, in combination, a vehicle frame and drive wheel, a shoe, a cutting member, an elevator extending rearwardly from said shoe, a horizontal chopper, comprising a pair of co-acting cutting members, a cleaning and feeding means co-acting with said cutting members, and provided with fingers, the fingers thereof extended to pass between the discs of said cutting members, a horizontal conveyor beneath said chopper, a cross conveyor, positioned to receive from said horizontal conveyor, and a means for operably connecting the mechanism of the machine to said drive wheel.

In testimony whereof we affix our signatures.

RAYMOND B. CLARK.
ROY C. CLARK.